March 30, 1943.  J. H. RAND, JR  2,315,274
MECHANICAL RAZOR
Filed Nov. 16, 1938  2 Sheets-Sheet 1
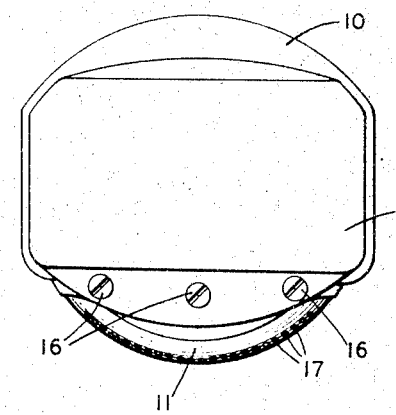
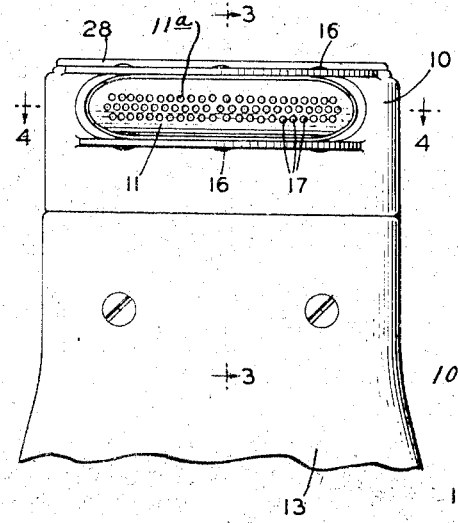
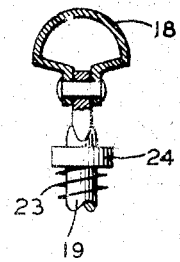
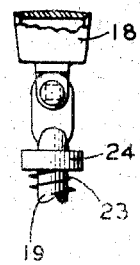
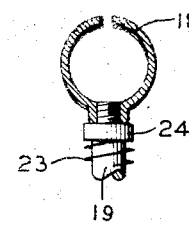
INVENTOR
J. H. RAND, JR.
BY W. A. Sparks
ATTORNEY March 30, 1943.　　J. H. RAND, JR　　2,315,274
MECHANICAL RAZOR
Filed Nov. 16, 1938　　2 Sheets-Sheet 2
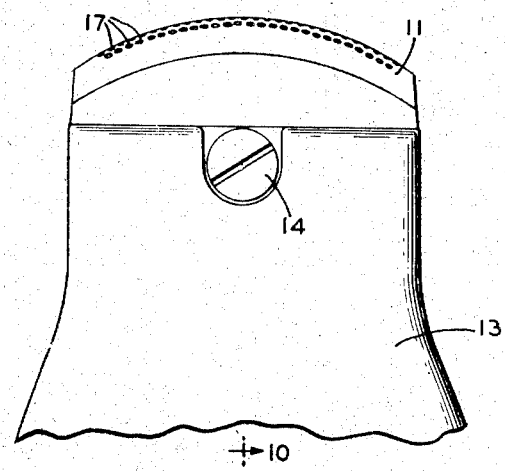
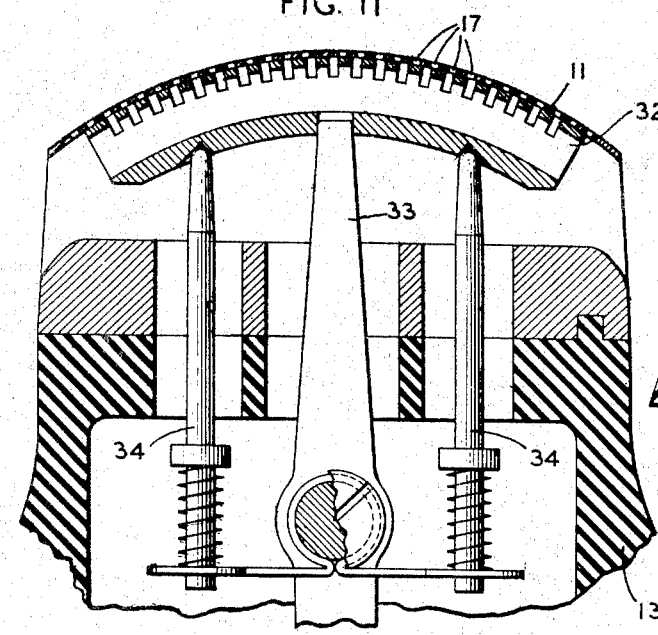
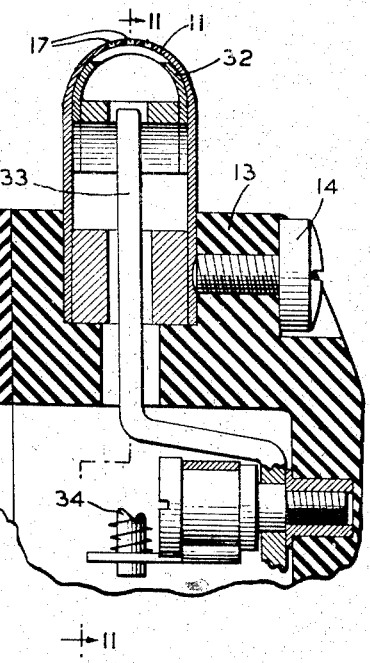
INVENTOR
J. H. RAND, JR.
BY F. A. Spark
ATTORNEY Patented Mar. 30, 1943

2,315,274

UNITED STATES PATENT OFFICE 2,315,274

MECHANICAL RAZOR

James H. Rand, Jr., Stamford, Conn., assignor to Remington Rand Inc., Buffalo, N. Y., a corporation of Delaware Application November 16, 1938, Serial No. 240,734

5 Claims. (Cl. 30—43)

This invention relates generally to the shearing members of mechanical razors and more particularly to a shear plate of novel construction, which plate is adapted for use with either rotary or oscillatory types of cutter members.

The shear plate of this invention is curved in two planes, longitudinally and transversely, so that the outer cutting surface thereof is generally convex in form. A particular advantage of a shear plate of this construction is that it greatly simplifies the process of shaving, in that all parts of the face may be shaved with equal effectiveness and with considerably less effort than has heretofore been required. A further advantage is gained by reason of the fact that a pressure of the convex surface of the shear plate against the face in a majority of cases causes the skin contacted by the plate to assume a concave form and thereby envelop the entire cutting surface of the shear plate. The razor thus always cuts against an inclined surface of the face and is enabled, thereby, to cut closely and rapidly. Disclosed in conjunction with the shear plate hereof, is a novel rotary cutter assembly comprised of a plurality of cutter members which move relatively to the shear plate, and about a common axis. An alternative form of cutter is also disclosed, which is of the more conventional oscillating type. All of the cutters have curved cutting edges, corresponding in shape to that of the shear plate.

An object of this invention is to increase the efficiency of a mechanical razor through the provision of a novel shear plate which simplifies the shaving of irregular facial contours and improves the general cutting action of the razor.

Another object of the invention is to increase further the efficiency of the razor by associating a rotary cutter assembly with the above mentioned shear plate.

Another object of the invention is to clear the inner surface of the shear plate of loose hair clippings by using the rotating motion of the cutter members to generate an air current.

Other objects and structural details of the invention will be apparent from the following description, when read in connection with the accompanying drawings, wherein:

Fig. 1 is a plan view of a razor, showing one embodiment of this invention;

Fig. 2 is a view in front elevation of the razor shown in Fig. 1;

Fig. 3 is a view in cross section, taken substantially along the line 3—3 of Fig. 2;

Fig. 4 is a sectional plan view, taken substantially along the line 4—4 of Fig. 2;

Fig. 5 is a detail view of one of the cutter members shown in Fig. 4, and is taken substantially along the line 5—5 of Fig. 4;

Figs. 6 and 7 are detail views of a modified form of cutter member capable of being used in the razor of the present invention;

Fig. 8 is a detail view of a further modified form of cutter member;

Fig. 9 is a fragmentary view, in front elevation, of a razor showing another embodiment of the invention;

Fig. 10 is a view in cross section, taken substantially along the line 10—10 of Fig. 9; and Fig. 11 is a view in longitudinal section taken substantially along line 11—11 of Fig. 10.

The cutter 18 of Figs. 6 and 7 differs from the cutter 18 of Figs. 3 and 4 only in the construction of the part attached to pin 19. Figs. 6 and 7 show how cutter 18 may be made from a sheet metal strip having the ends offset into spaced parallel relation to engage opposite sides of the flattened end of a pin 19 for riveted connection thereto.

Fig. 8 illustrates a cutter 18 similar to that shown in Figs. 3 and 4, but having a bifurcation to provide a pair of arms for tensioning to provide resilient engagement of the arms with the inner faces of the stationary shear plate 11 and guide tracks 15a when substituted in Figs. 3 and 4.

The cutters of Figs. 6, 7 and 8 are obviously used for the structures illustrated in Figs. 1 to 4 for substitution in place of cutters 18 as shown.

This invention is concerned with the shearing heads of mechanical razors or like devices and the following description is directed only to a disclosure of a few practical embodiments.

In the embodiment of the invention shown in Figs. 1, 2, 3, and 4, it will be seen that the shearing head is comprised of a casing 10, a shear plate 11 and an inner cutter assembly indicated generally at 12 in Fig. 3. Casing 10 is formed to provide front wall 10a, rear wall 10b, and end walls 10c. One side wall 10d is formed with a projection as illustrated in Fig. 3 to engage in a socket or channel in the end of handle 13. The other side wall is formed with an opening to provide access to the interior of the casing, while front wall 10a is formed to provide an elongated opening at opposite sides of which are provided a pair of forwardly extending spaced parallel flanges 10e. The head is substantially circular in form, and it will be seen that the shear plate 11 extends horizontally from the razor at right angles to the main body thereof. As shown in Fig. 3, the casing 10 is supported at the upper end of the usual motor enclosure, handle, or grip 13, and is held against movement by a set screw 14. Casing 10 is formed as shown in Fig. 3 having a channel 15 in its upper portion. An opening of approximately elliptical shape is cut in the front wall 10a of the casing 10, at the point where it forms the channel 15, and the shear plate 11 is fitted into this opening and secured therein by screws 16. A series of perforations 17 (Fig. 2) are cut in the shear plate 11. Shear plate 11 is preferably formed of sheet metal or the like to provide a shaving section 11a from the central portion of the sheet metal forming the plate having a substantially semi-circular shape in transverse cross section and an arcuate shape in longitudinal cross section. Opposite edges of the shaving section merge into side walls 11b that are arranged in spaced parallel relation and terminate in a substantially rectangular base portion at the free marginal edges thereof for seating engagement in the opening in front wall 10a of casing 10 between flanges 10e, in the manner shown in Figs. 3 and 4. The ends of shear plate 11 as illustrated in the drawings are rounded as shown particularly in Fig. 2, and in this manner the shape varies slightly from a true rectangular form. It will be evident that the shear plate 11 could be formed integrally with the casing 10, if desired. The construction shown is, however, the less expensive of the alternative forms and for that reason is the preferred embodiment.

Considering now the inner cutter assembly 12, it will be seen upon reference to Fig. 4 that this assembly is comprised of a plurality of cutter elements 18, associated pins 19, and a supporting cup-shaped plate 21. Formed in the vertical lip of the plate 21 are four notches 22 adapted to receive the pins 19. The pins 19 may be rigidly connected to their associated cutter elements 18 in any suitable manner and each assembly of cutter element and pin is urged outwardly, away from the plate 21, by means of a compression spring 23 which surrounds the pin and presses against a fixed collar 24. As shown in Fig. 3 the cutter elements 18 extend into the channel 15 of casing 10 and are adapted, when plate 21 is rotated, to sweep across the inner surface of the shear plate 11, thereby cutting hair projecting through the perforations 17. Referring to Fig. 3, it will be seen that the channel 15 is formed with annular grooves or cutter tracks 15A which engage the upper and lower portions of the cutter elements 18 and hold the cutting edges thereof out of contact with the vertical wall of the channel 15. The cutter elements 18 are thus guided in a circular path by the grooves or cutter tracks 15A until they come into contact with the shear plate 11, thus protecting the cutting edges of the elements 18 from damage and excessive wear.

In order that loose hair clippings will not gather inside the shear plate and hinder the cutting action, each cutter element is formed with a downwardly extending ear 25 (Figs. 3 and 5) which acts as a fan to generate an air current and keep the shear plate clear. The means for rotating the inner cutter assembly resides in a vertical shaft 26 (Fig. 3), rotated by a motor supported in the grip 13. The shaft 26 is squared near its upper end to engage an opening of corresponding shape in the plate 21. The extreme upper end of the shaft projects through the plate 21 and is threaded to permit a nut 27 to be secured thereon. The shaft 26 and plate 21 thus turn as a unit to rotate the cutting elements 18.

To permit access to the inner cutter for purposes of replacement, cleaning or the like, a rectangular opening is cut in the top of the casing 10, which opening is normally closed by a cover 28. The cover 28 is equipped with spring clips 29 and may be easily removed. The plate 21 is also covered by a plate 30 which insures the retention of the pins 19 in the notches 22. This plate is preferably fixed to the ring plate by means of screws 31.

Illustrated in Figs. 6 and 7 and 8 are replaceable cutter elements 18 of a modified form.

Figs. 9, 10, and 11 illustrate a second embodiment of the invention. As shown in Figs. 10 and 11, the shear plate 11 of this embodiment is of the same general shape as that previously described but is supported directly by the grip or handle 13 and projects upward in the usual manner instead of horizontally as in the first embodiment. The cooperating cutter element is in this instance a single member 32, slotted transversely at the top to form shearing edges, and shaped to correspond with the outline of the shear plate. An operating arm 33 projects upward from the grip 13 and serves to reciprocate the cutter 32 relatively to the shear plate, while the usual spring-pressed pins 34 engage notches in the cutter insuring constant pressure against the plate.

What I claim as new, and desire to secure by Letters Patent, is:

1. A shaver head comprising an outer sheet metal shear plate formed to provide an outer shaving section of semi-circular shape in cross section and side portions extending therefrom in spaced parallel relation, said shaving section having the semi-circular portion thereof formed into arcuate shape longitudinally of said shear plate, said shaving section having a plurality of apertures formed therein to provide a plurality of cutting edges on said shaving section about the margins of said apertures, said shear plate having a substantially rectangular base portion carrying said shaving section, and an inner cutter of arcuate form longitudinally and of semi-circular cross section concentric to the corresponding portions of said outer shear plate for curvilinear travel in surface contact with the inner surface of said shaving section, said inner cutter being formed to provide a plurality of cutter bars throughout the portion engaging said shaving section for cutting cooperation therewith in the movement of said inner cutter in its curvilinear travel in said outer shear plate.

2. A shaver comprising a casing having a flat end formed with a transverse channel, a shaver head having a shaving section and a base portion, said base portion having a rectangular shape and seating in said channel in the casing for mounting said head on the end of the casing with the shaving section projecting outwardly therefrom, said shaving section being formed to provide a passage extending longitudinally of said head and open at opposite ends, said shaving section being of partially arcuate shape longitudinally and semi-circular in cross section and having a plurality of apertures therein with cutting edges formed about the margins thereof, the central portion of said shaving section projecting farther outward from the end of said casing than the ends thereof, and an inner cutter of arcuate form longitudinally having a portion semi-circular in cross section mounted in said passage in said shaving section in concentric relation and surface contact with the inner surface of said shaving section, said inner cutter being formed with a plurality of cutter bars in said portion engaging said shaving section for cutting cooperation therewith in curvilinear movement longitudinally in said head.

3. A shaver having a handle and a shaft rotatable therein having one end projecting beyond one end of said handle comprising a casing formed with a front wall, rear wall, end walls, one side formed for cooperation with the end of said handle for mounting said casing thereon and receiving the end of said shaft within said casing, and another side wall formed with an opening to provide access to the interior of said casing, said front wall being formed with a pair of spaced parallel forwardly extending flanges having an opening therebetween, said rear wall and end walls being formed to provide a pair of spaced parallel partially circular cutter tracks extending to said front wall opening, a shear plate formed of sheet metal having spaced side walls engaging said flanges, said shear plate having a shaving section extending between said side walls of substantially semi-circular transverse cross section and partially circular in longitudinal cross section for registry in assembled relation on said casing with said cutter tracks to form a continuation thereof and provide a completely circular cutter track structure, said shaving section being formed with a plurality of apertures to provide a plurality of cutting edges on said section about said apertures, a supporting plate mounted on the end of said shaft in said housing for rotation with said shaft, a plurality of radially and resiliently projected pins mounted in said supporting plate, and a tubular cutter mounted on the outer end of each pin with the outwardly disposed peripheral portion thereof having bearing engagement with the inner surface of said shaving section and cutter tracks successively for guidance thereby in the rotation of said shaft for moving said cutters for cutting cooperation with the cutting edges on said shaving section.

4. A shaver having a handle comprising a casing having a front wall and one side wall formed for cooperation with one end of said handle for mounting said casing thereon, the front wall of said casing being formed with an opening, said casing also being formed in the interior thereof with a pair of spaced parallel partially circular cutter tracks terminating at said opening, a shear plate mounted on said casing over said front wall opening and having a pair of spaced side walls connected by a shaving section, said shaving section being substantially semi-circular in transverse cross section and partially circular in longitudinal cross section in registry with said cutter tracks for cooperation therewith to provide a completely circular cutter track structure, said shaving section being formed with a plurality of apertures providing a plurality of cutting edges on said shaving section around the margins of said apertures, an inner cutter supporting structure rotatably mounted in said housing, a plurality of radially movable pins mounted in said inner cutter supporting structure and resiliently projected outwardly therefrom, and inner movable cutters mounted on said pins and having the outer portions thereof slidably engaging said cutter tracks and the inner surface of said shaving section for rotary movement in said casing and shear plate and cutting cooperation with the cutting edges on said shear plate during said rotary movement thereof.

5. A shaver comprising an outer sheet metal shear plate formed to provide an outer shaving section of substantially semi-circular transverse cross section and partially circular longitudinal cross section, side walls carried by the opposite sides of the shaving section in spaced parallel relation, said shaving section and side walls being formed at the free edges thereof to provide a substantially rectangular base portion for mounting on a suitable supporting structure, said shaving section being formed with a plurality of apertures to provide a plurality of cutting edges on said shaving section about the margins thereof, and an inner cutter movably mounted for slidable engagement with the inner surface of said shaving section for movement thereover in the movement of said inner cutter, said inner cutter having an outer semi-circular cutter portion formed in concentric relation with the semi-circular cross section of said outer cutter shaving section for surface contact therewith and cutting cooperation with the cutting edges thereon in the curvilinear travel of said inner cutter over the inner surface of said shaving section.

JAMES H. RAND, Jr.

CERTIFICATE OF CORRECTION.

Patent No. 2,315,274.　　　　　　　　　　　　　　March 30, 1943.

JAMES H. RAND, JR.

It is hereby certified that error appears in the printed specification of the above numbered patent requiring correction as follows: Page 1, second column, line 16, beginning with "The cutter 18" strike out all to and including the word and period "shown." in line 32 and insert the same before "Figs. 9", page 2, second column, line 13; and that the said Letters Patent should be read with this correction therein that the same may conform to the record of the case in the Patent Office.

Signed and sealed this 18th day of May, A. D. 1943.

(Seal)

Henry Van Arsdale,
Acting Commissioner of Patents.